(12) United States Patent
Graceffo

(10) Patent No.: US 9,148,195 B2
(45) Date of Patent: Sep. 29, 2015

(54) MODE HOPPING SPREAD SPECTRUM MODULATION

(71) Applicant: RAYTHEON COMPANY, Waltham, MA (US)

(72) Inventor: Gary M. Graceffo, Burke, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/593,253

(22) Filed: Jan. 9, 2015

(65) Prior Publication Data

US 2015/0200704 A1     Jul. 16, 2015

Related U.S. Application Data

(60) Provisional application No. 61/925,850, filed on Jan. 10, 2014.

(51) Int. Cl.
*H04B 1/69* (2011.01)
*H04B 1/707* (2011.01)
*H04B 1/713* (2011.01)
*H04L 27/04* (2006.01)

(52) U.S. Cl.
CPC ............... *H04B 1/707* (2013.01); *H04L 27/04* (2013.01); *H04B 2001/6916* (2013.01)

(58) Field of Classification Search
CPC .. H04B 1/707; H04B 2001/6916; H04B 1/69; H04B 7/0676; H04B 7/0695; H04L 27/04
See application file for complete search history.

(56) References Cited

U.S. PATENT DOCUMENTS

| | | | | |
|---|---|---|---|---|
| 3,999,182 A * | 12/1976 | Moeller et al. | ................. | 342/372 |
| 5,103,232 A * | 4/1992 | Chang et al. | ................... | 342/372 |
| 5,543,806 A * | 8/1996 | Wilkinson | ..................... | 342/368 |
| 6,275,679 B1 * | 8/2001 | Elam et al. | .................... | 455/26.1 |
| 6,463,301 B1 * | 10/2002 | Bevan et al. | ............... | 455/562.1 |
| 2013/0077658 A1 * | 3/2013 | Hui et al. | ...................... | 375/219 |

\* cited by examiner

*Primary Examiner* — Phuong Phu
(74) *Attorney, Agent, or Firm* — Christie, Parker & Hale, LLP

(57) ABSTRACT

A method and apparatus for data modulation in an antenna array include: storing input data comprising of a plurality of data bits, in a buffer; generating a pseudo random number; computing a transmission mode from the pseudo random number; based on the computed transmission mode and the number of antenna elements in the antenna array, computing a particular phase offset for each antenna element; sequentially providing the stored input data, one bit at a time, to each antenna element; and transmitting the input data from each antenna element according to the computed particular phase offset for said each antenna element.

12 Claims, 11 Drawing Sheets

Rotation of phase front

Rotations for OAM States N=1, 2, 3

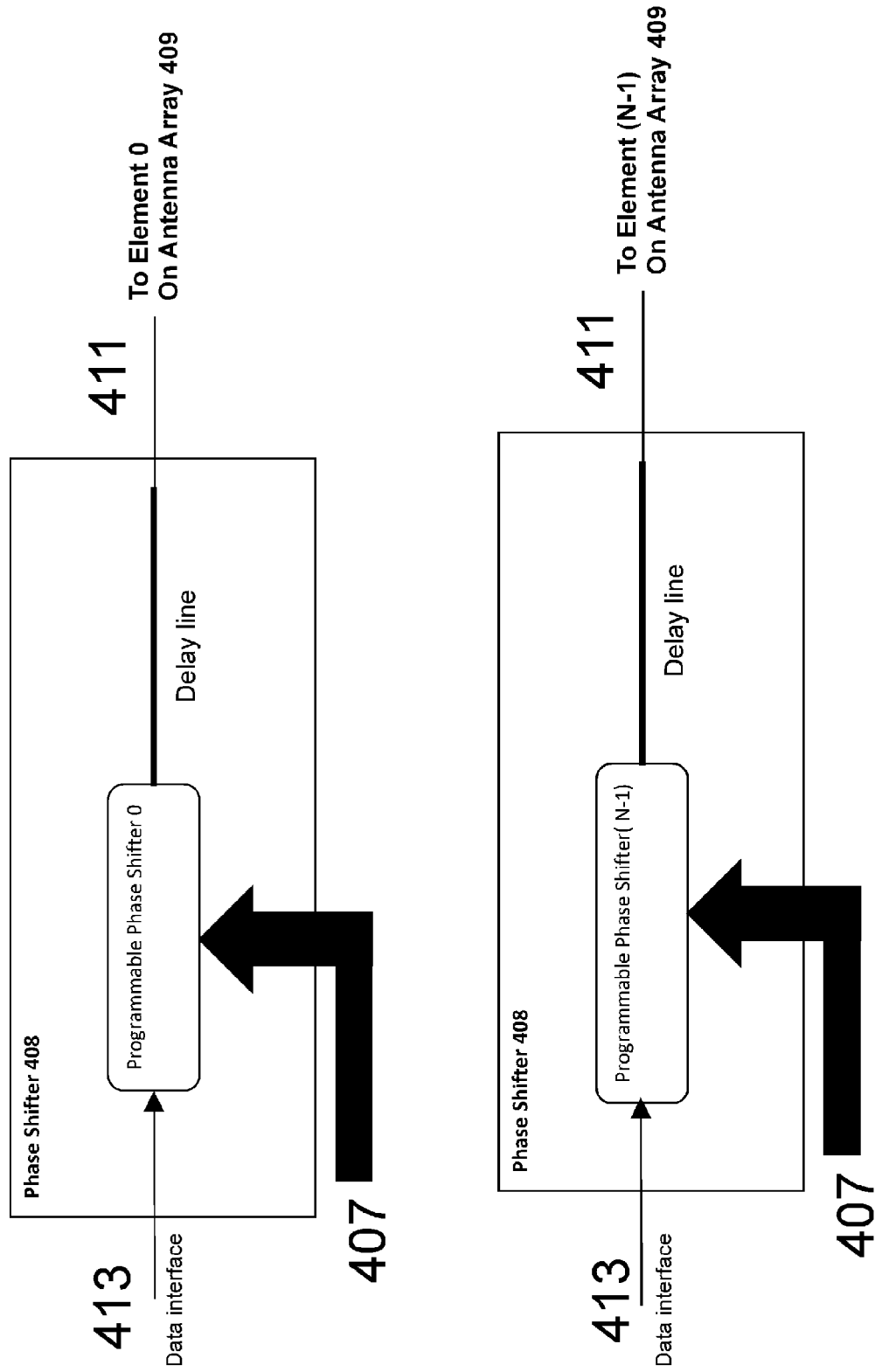

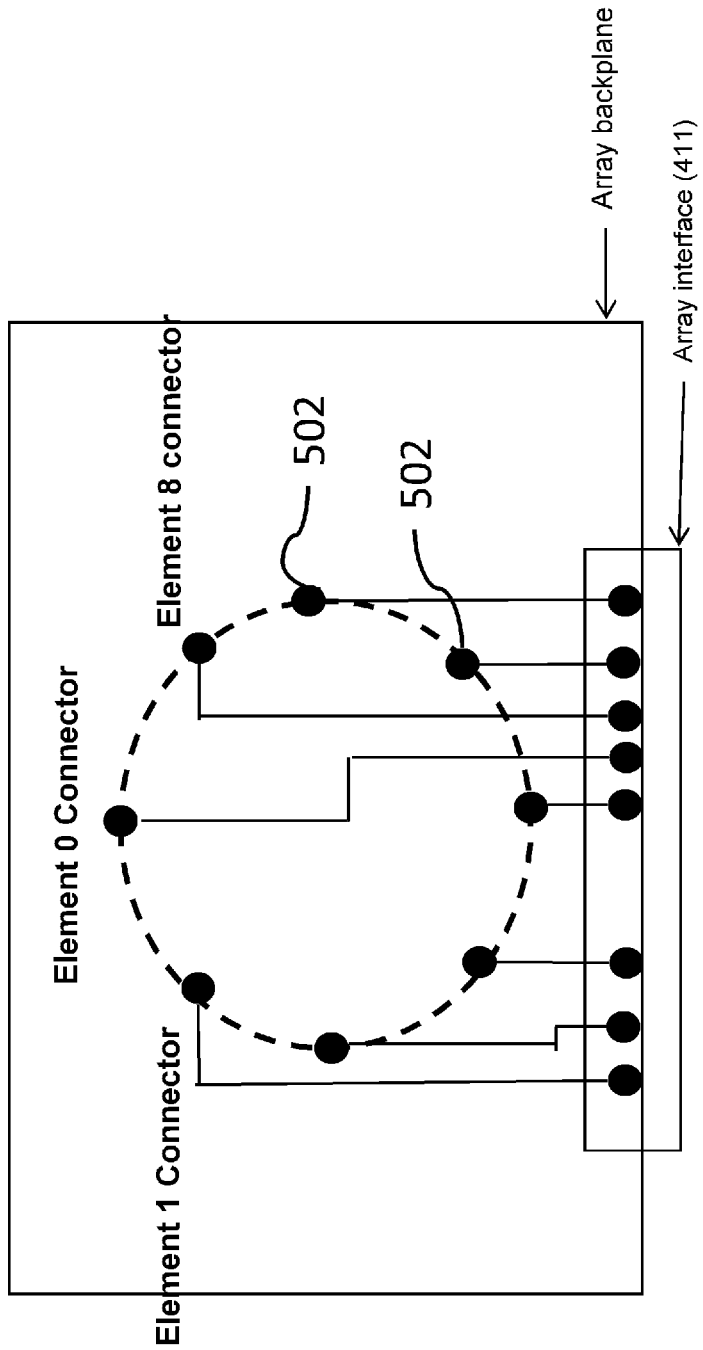

MODE HOPPING SPREAD SPECTRUM MODULATION

CROSS-REFERENCE TO RELATED APPLICATIONS

This Patent Application claims the benefits of U.S. Provisional Patent Application Ser. No. 61/925,850, filed on Jan. 10, 2014 and entitled "Mode Hopping Spread Spectrum Modulation," the entire content of which is hereby expressly incorporated by reference.

FIELD OF THE INVENTION

The present invention relates generally to signal modulation techniques and more specifically to mode hopping spread spectrum modulation.

BACKGROUND

There are ever increasing methods offered to improve privacy and spectral efficiency in wireless communications. For example, methods such as direct sequence spread spectrum communications, frequency hopped spread spectrum, and burst mode communications are just a few of the waveform solutions for enhanced privacy. Spectral efficiency is achieved by using modulation that is more efficient and coding techniques such as 128-QAM and Turbo codes respectively.

Spread spectrum techniques, which are widely used in signal communications, spread a signal with a relatively narrow bandwidth over a much wider bandwidth, 1000× greater for example. Some applications of spread spectrum includes communications privacy, increasing resistance to noise, interference and jamming of signals. It is also used to prevent signal detection and eavesdropping, and to limit power flux density, for example, in satellite downlink communications. Frequency hopping is one of the modulation techniques used in spread spectrum signal transmission.

In a frequency-hopping spread spectrum (FHSS) communication, radio signals are transmitted by rapidly changing carrier frequencies among many available frequencies, using a pseudorandom sequence known to both the transmitter and the receiver. The overall bandwidth required for frequency hopping is much wider than that required to transmit the same information using only one carrier frequency. However, because transmission occurs only on a small portion of this bandwidth at any given time, the power spectral density is reduced in proportion to the ratio of the hopping bandwidth to the instantaneous bandwidth.

The term mode refers to solutions to the Wave Equation. The Wave Equation is a second order partial differential equation whose solution describes the propagation mode of a wave. The wave equation has an infinite number of solutions, where each solution is a mode. For plane waves, mode zero is the solution. For non-plane waves, there are an infinite number of positive and negative integer solutions.

SUMMARY

In some embodiments, the present invention is a secure communication solution that uses a mode hopping spread spectrum technique to achieve security.

In some embodiments, the present invention is a method for data modulation in an antenna array, which includes a plurality of antenna elements. The method includes: storing input data comprising of a plurality of data bits, in a buffer; generating a pseudo random number; computing a transmission mode from the pseudo random number; based on the computed transmission mode and the number of antenna elements in the antenna array, computing a particular phase offset for each antenna element; sequentially providing the stored input data, one bit at a time, to each antenna element; and transmitting the input data from each antenna element according to the computed particular phase offset for said each antenna element.

In some embodiments, the present invention is an apparatus for data modulation in an antenna array, which includes a plurality of antenna elements. The apparatus includes: a buffer for storing input data comprising of a plurality of data bits; a pseudo random number generator for generating a pseudo random number; a mapper circuit for computing a transmission mode from the pseudo random number; a plurality of phase shifters for determining a particular phase offset for each antenna element, based on the computed transmission mode and the number of antenna elements in the antenna array; and a transmitter for sequentially providing the stored input data, one bit at a time, to each antenna element. The antenna array transmits the input data from each antenna element according to the computed particular phase offset for said each antenna element In contrast to the conventional frequency hopping spread spectrum (FHSS) method, all of the input data bits are transmitted with the same frequency, according to the present invention.

BRIEF DESCRIPTION OF THE DRAWINGS

These and other features, aspects, and advantages of the present invention will become better understood with regard to the following description, appended claims, and accompanying drawings.

FIG. 4C is a block diagram for two similar phase shifters, according to some embodiments of the present invention.

FIGS. 5A and 5B are exemplary diagrams depicting a circular antenna configuration, according to some embodiments of the present invention.

DETAILED DESCRIPTION

In some embodiments, the present invention is a communication system and method for transmitting a message, using multiple propagation modes. In some embodiments, the invention sends a predetermined number of bits using, for example, a Mode A and then proceeds to a second mode, for example, a Mode B, and so on. Both the receiver and the transmitter have knowledge of the mode sequence to be used. In some embodiments, the mode progression is based on a pseudo random number sequence.

The communications method and system of the present invention provides both spectrum efficiency and security. Spectrum efficiency in that multiple modes may transmit on a particular frequency on a non-interfering basis. Security in that unless both the receiver and the transmitter know the mode hopping sequence, detection will be nearly impossible.

In some embodiments, the present invention is a mode hopping spread spectrum (MHSS) technique offering a new and innovative approach to privacy and spectral efficiency. The MHSS according to the present invention uses each wave mode as an independent communications channel, which is conceptually somewhat analogous to frequency hopping spread spectrum (FHSS). The purpose of frequency hopping spread spectrum is to spread a narrow band signal over a very large bandwidth to reduce the power spectral density, such that the resulting signal has a power density less than that of the noise floor, which makes the signal difficult to detect by unintended recipients. MHSS borrows from this concept, but instead of hopping across many frequencies to reduce the power spectral density of the signal, it "hops" the signal across many quantum states or modes of the same frequency. In some embodiments, the receiver and the transmitter hop or switch modes synchronously, as a function of time, according to a predetermined sequence. The hop sequence is obtained from a set of available mode numbers. The mode numbers are accessed in a random order using a pseudo random number (PRN) generator.

In conventional communication, data is transmitted by modulating, frequency, phase, amplitude, or any combination of these three waveform elements. MHSS adds an additional dimension; the mode can also be modulated. The MHSS technique of the present invention uses the wave front phase rotation to add additional dimensions to a conventional modulation scheme. For example, on-off keying (OOK) modulation can be augmented with mode hopping. The MHSS technique provides spectral efficiency because the maximum Shannon channel rate applies to each mode separately and therefore expands the overall channel rate. Privacy is improved because of the continued mode hopping.

Figure 1A:
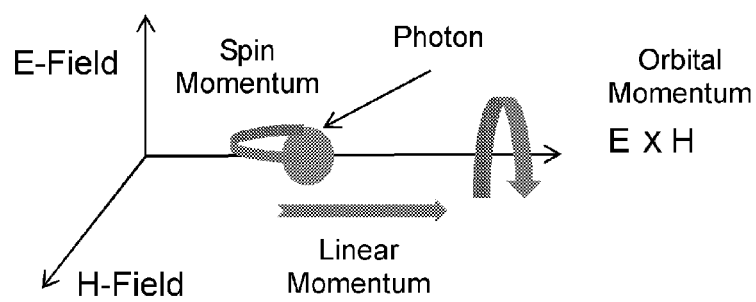
FIGS. 1A-1C show the momentum properties of a photon travelling in space.

FIG. 1A provides insights into how the propagation modes are generated. FIG. 1A shows the momentum properties of a photon travelling in space. As shown, the photon has three momentum properties; linear momentum, spin momentum and orbital momentum. The linear momentum generates the electric and electromagnetic fields. The spin (angular) momentum determines if the electric filed is circularly or linearly polarized. In a circular polarization, electric field of a passing wave does not change strength but only changes direction in a rotary manner. Spin momentum has three states; a left circular state, a right circulate state and a linear state. The orbital angular momentum (OAM) of a photon imparts an azimuthal phase dependency on the electric and electromagnetic fields. Phase is no longer constant across the wavefront, as it is in a Mode 0 plane wave. The orbital momentum has an infinite number of states.

Figure 1B:
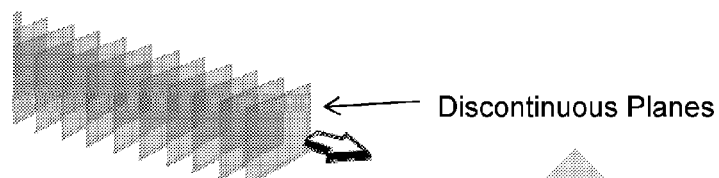
Figure 1C:
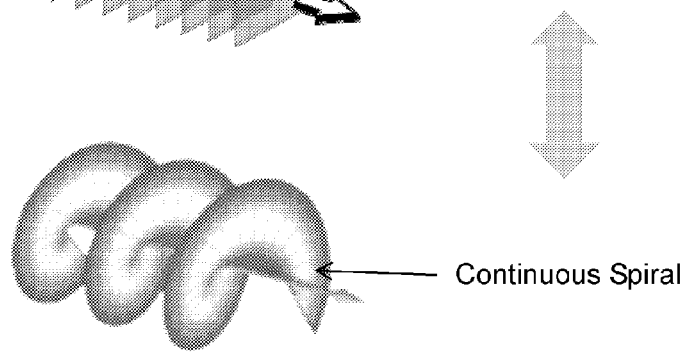

As shown in FIG. 1B, the wavefronts of a plane wave are discontinuous planes that are orthogonal to each other and thus have the same phase. In contrast, as depicted in FIG. 1C, the wavefronts of a twisted wave are continuous spiral having phase rotation.

Figure 2:
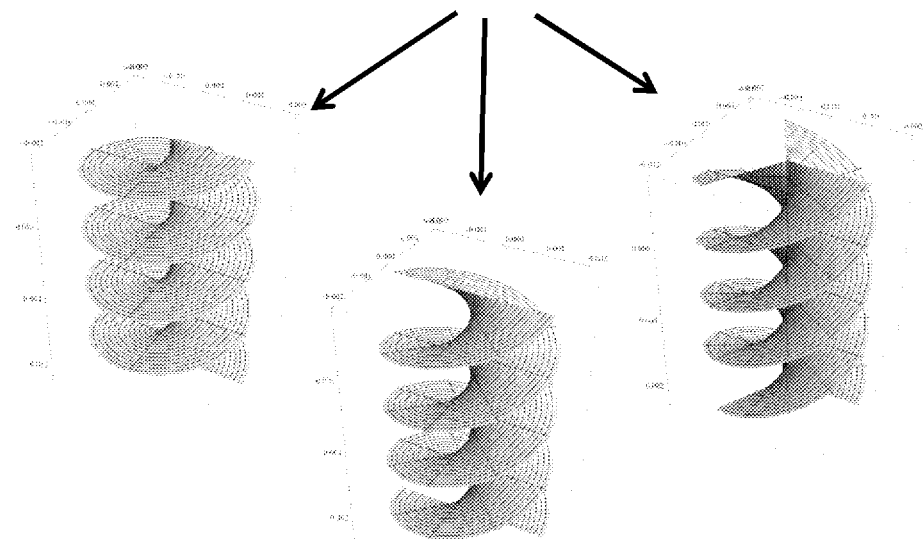
FIG. 2 diagrammatically illustrates properties of a twisted wave.

FIG. 2 illustrates properties of twisted waves for Modes 1, 2, and 3. As shown, for a Mode 1 solution, shown in left rotation, the phase front rotates clockwise. The phase front rotates 2 pi over the length of a wave. Because of the rotation, if one were to follow the point of constant phase as the wave propagates in space over time a helix will be inscribed. The pitch of the helix increases with each mode, which allows the trace to complete the correct number of 2 pi rotations for a particular mode. Mode solutions can also be negative. Negative modes cause a counter's clockwise rotation.

All modes are orthogonal; even when the magnitude of the mode numbers are the same but the signs are opposite such as 1 and −1. For a Mode 2 solution, shown in middle rotation, the phase front rotates clockwise 4 pi over the length of a wave. For a Mode 3 solution, shown by the right rotation, the phase front rotates clockwise 6 pi over the length of a wave. This pattern continues for all available modes. There are a total of M=2n+1 modes available for a system supporting n elements. For example, if n=2, then the available modes are [−2, −1, 0, 1, 2] or five modes.

The waveform S(t) that takes advantage of these propagation modes can be expressed mathematically, as shown in Equation 1. This equation is specific to on/off keying (OOK).

$$S(t) = \sum_{\substack{i=0 \\ by \\ Nb}}^{N-1} \sum_{k=1}^{Nb} \overline{A(i+k)} (i + k e^{jw\tau \hat{\phi}(i+k)}) \quad (1)$$

Where, N is the number of bits to be transmitted, Nb is the number of bits per mode, $A_{i+k}$ is a vector with entries of zero and one which represent a zero data bit or one data bit respectively, w is the operating radian frequency (which remains constant), and $\hat{\Phi}$ is a basis vector which contains the mode for each bit transmitted.

Figure 6:
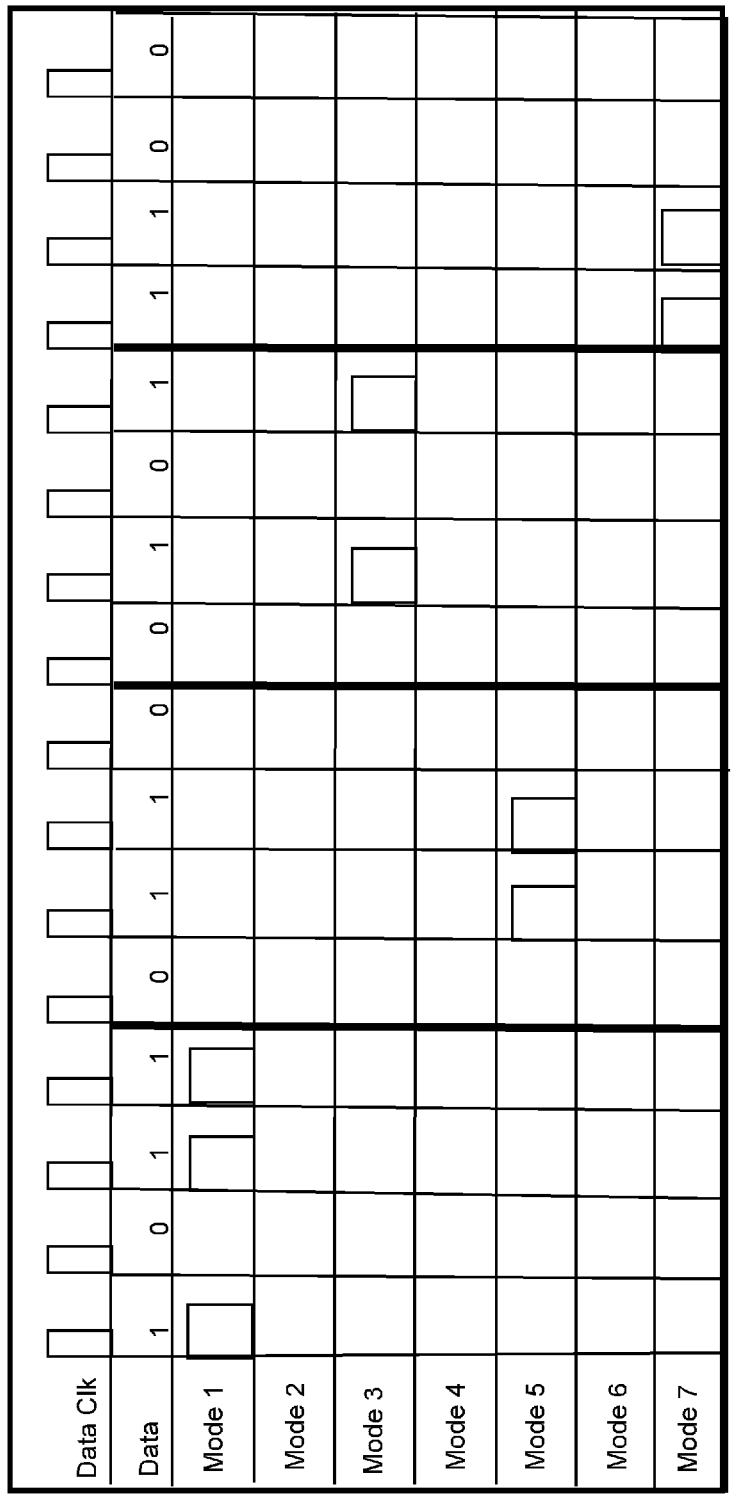
FIG. 6 is an exemplary timing diagram illustrating the transmission of data, as a function of time and transmission mode, according to some embodiments of the present invention.

FIG. 6 is an exemplary timing diagram illustrating the transmission of data, as a function of time and transmission mode, according to some embodiments of the present invention. It depicts a timeline for transmitting a bit sequence. As shown, time moves progressively from left to right of the diagram. The first row is the data clock, which is used to synchronize the transmission. The second row is the data to be transmitted, [1011 0110 0101 1100], the remaining rows are the transmission modes. For this example, 4 bits are transmitted before a mode change occurs using on-off keying (OOK). In some embodiments, the modes are selected using a pseudo random sequence known to both the transmitter and receiver. The number of bits per mode can be any desired number. Bits can even be chipped, such that one bit is sent across multiple modes.

For the example presented in FIG. 6: N is 16 bits, Nb is 4 bits, and data to be transmitted represented in hex is [$11_{16}$ $6_{16}$ $5_{16}$ $C_{16}$]. Also, vector A has the corresponding amplitudes: [1 0 1 1 0 1 1 0 0 1 0 1 1 1 0 0], and vector $\hat{\Phi}$ contains the random mode values. For this example: [1111 5 5 5 5 3333 77 77]

As shown is FIG. 6 and illustrated in Equation 1, vector A contains ones and zeros, which represent the data bit states. Given that in this example four bits are transmitted using each mode, each mode value is repeated four times in the vector. Vectors A and φ are therefore the same size. Vector φ is responsible for the mode-hopping attribute of this waveform.

Figure 7:
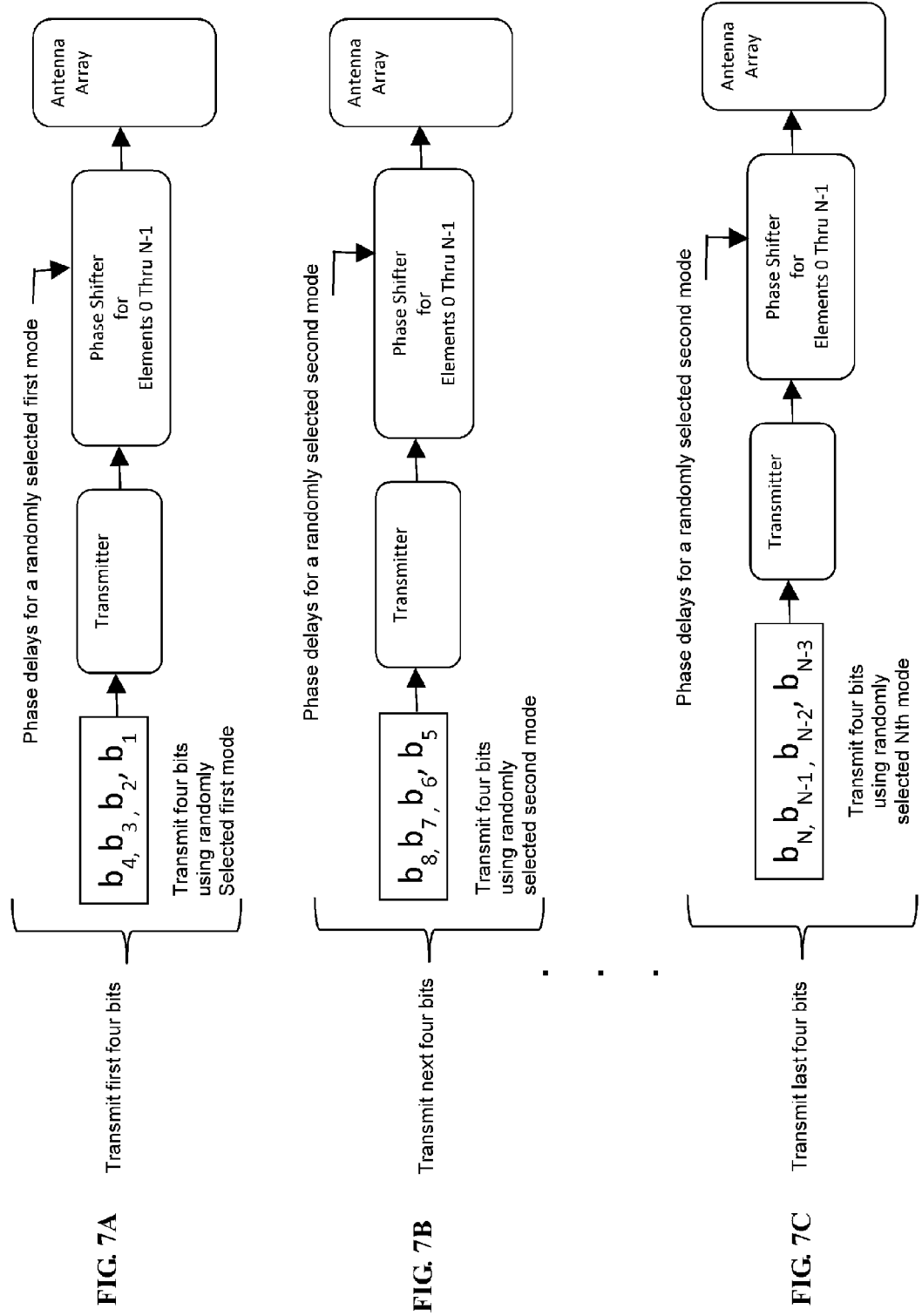
FIGS. 7A-7C are exemplary notional diagrams showing the mode changes required as each group of bits are transmitted on a particular mode, according to some embodiments of the present invention.

FIGS. 7A-7C are exemplary notional diagrams showing the mode changes required as each group of bits are transmitted on a particular mode, according to some embodiments of the present invention. FIG. 7A illustrates the transmission of bits 1 through 4 using a random mode. FIG. 7B illustrates the transmission of bits 5 through 8, using a second randomly selected mode. The process continues until all bits are transmitted. FIG. 7C shows the transmission of the last four bits, using a randomly selected mode.

Figure 3:
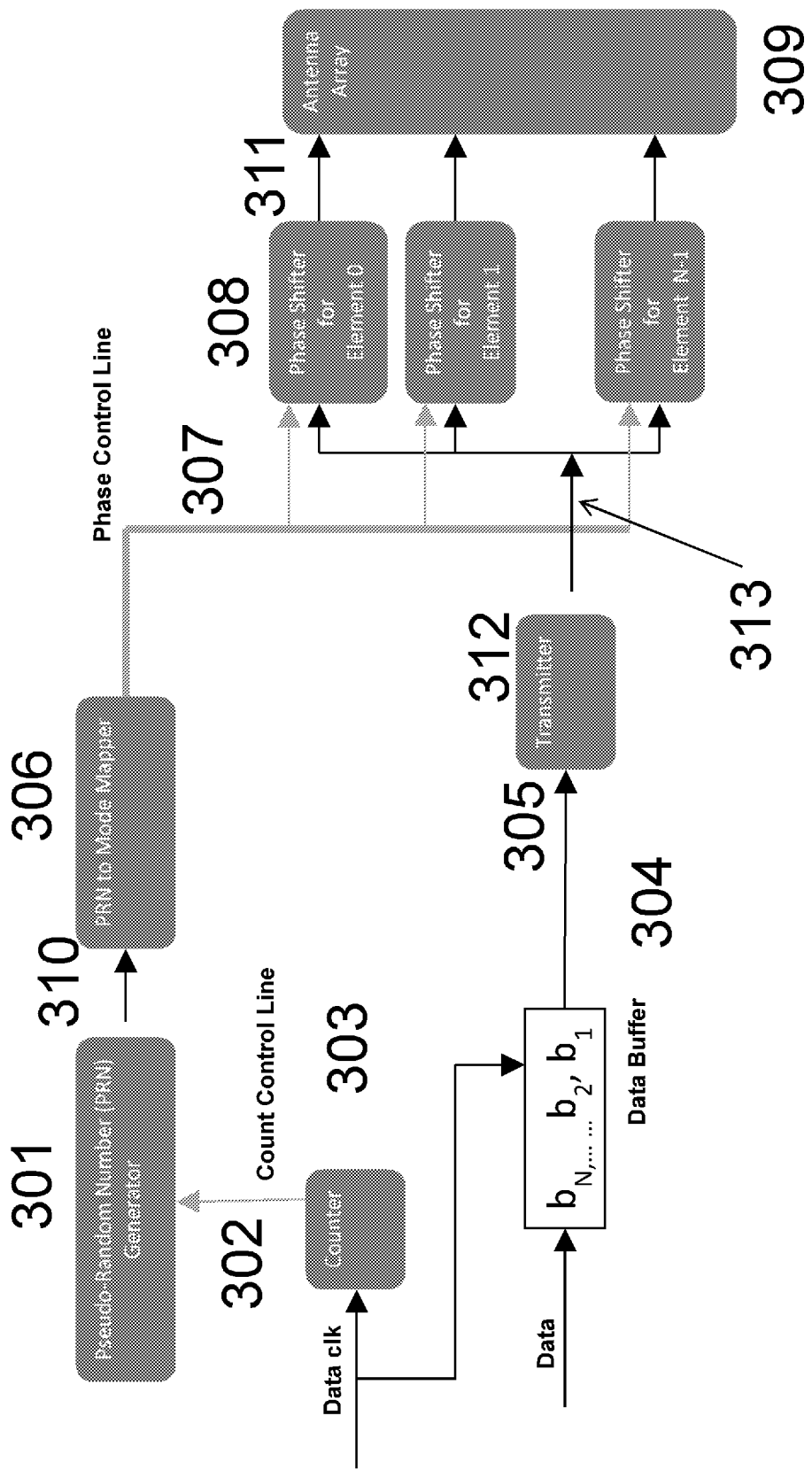
FIG. 3 is an exemplary block diagram for MHSS generating circuit, according to some embodiments of the present invention.

FIG. 3 is an exemplary block diagram for MHSS generating circuit, according to some embodiments of the present invention. As shown, the input data is clocked into a data buffer 304, for example, a first-in-first-out (FIFO) buffer. The same clock is used to clock a counter 303 to generate a control signal 302 that is used to cue a random number generator (PRN) 301. Counter 303 is used to count the number of bits transmitted per mode. When the predetermined number of bits is reached, the counter asserts control signal 302, which cues PRN 301 to generate another random mode number.

Figure 4A:
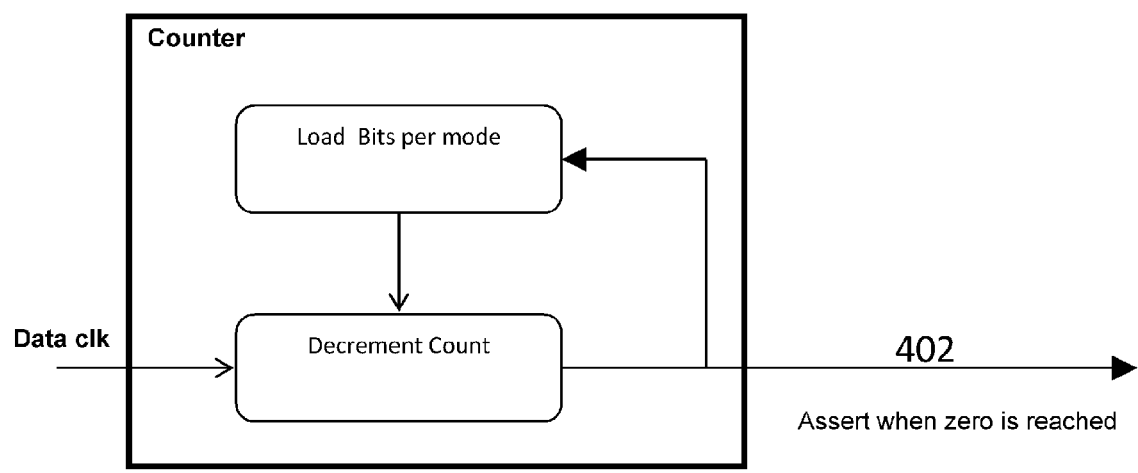
FIG. 4A is a block diagram for a counter, according to some embodiments of the present invention.

FIG. 4A is a block diagram for a counter, according to some embodiments of the present invention. As shown, the counter is a countdown counter. Initially, the counter is pre-loaded with the value bits-per-mode, on each Data clock, it decrements the count. Once zero is reached, internally, the counter reloads the bits-per-mode value and asserts control line 302 (in FIG. 3) and the process repeats continually, until the data clock stops.

Figure 4B:
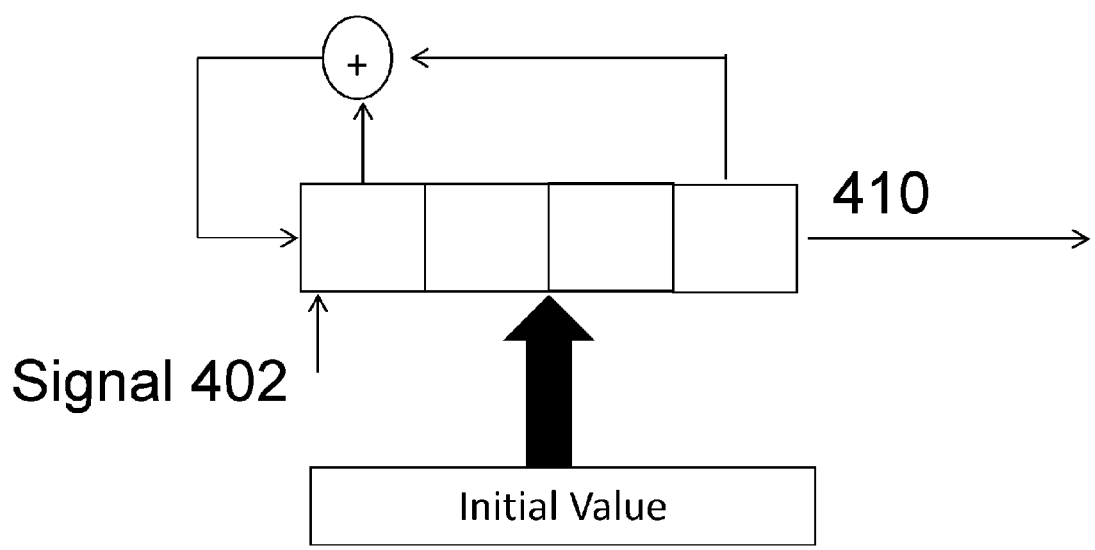
FIG. 4B is a block diagram for a pseudo random number generator, according to some embodiments of the present invention.

FIG. 4B is a block diagram for a pseudo random number generator, according to some embodiments of the present invention. There are many known ways to generate pseudo random numbers. One implementation is shown in FIG. 4B, which uses a four-stage maximal length sequence generator. The generator has $2^4-1$ states and thus counts randomly from 1 to 15. This implementation supports 15 modes. The most significant bit is used as a sign bit. The generator is initially loaded with a pre-determined value such as 7, then each time signal 402 is asserted, a new mode number is generated. The mode is interpreted according to the Table I below:

TABLE I

| Register Values | MSB | bit 2 | bit 3 | bit 4 | Mode |
|---|---|---|---|---|---|
| 1 | 0 | 0 | 0 | 1 | 1 |
| 2 | 0 | 0 | 1 | 0 | 2 |
| 3 | 0 | 0 | 1 | 1 | 3 |
| 4 | 0 | 1 | 0 | 0 | 4 |
| 5 | 0 | 1 | 0 | 1 | 5 |
| 6 | 0 | 1 | 1 | 0 | 6 |
| 7 | 0 | 1 | 1 | 1 | 7 |
| 8 | 1 | 0 | 0 | 0 | 0 |
| 9 | 1 | 0 | 0 | 1 | −1 |

TABLE I-continued

| Register Values | MSB | bit 2 | bit 3 | bit 4 | Mode |
|---|---|---|---|---|---|
| 10 | 1 | 0 | 1 | 0 | −2 |
| 11 | 1 | 0 | 1 | 1 | −3 |
| 12 | 1 | 1 | 0 | 0 | −4 |
| 13 | 1 | 1 | 0 | 1 | −5 |
| 14 | 1 | 1 | 1 | 0 | −6 |
| 15 | 1 | 1 | 1 | 1 | −7 |

Referring back to FIG. 3, a PRN to Mode mapper 306 computes the phase delay for each antenna element of antenna array 309, as a function of the number generated by the PRN generator 301. The per element phase is computed according the following equation:

$$E\phi = 2\pi \frac{n*m}{N-1} \quad (2)$$

where N is the number of array elements, n is the element number (0 to N−1), m is the mode number supplied by the PRN Generator (−(N−1) to N−1). The PRN mapper 306 assigns the appropriate phase values to each of the phase shifter circuits 308 according to the above equation over an interface 307. Table II below depicts the mode hopping & phase computation for an antenna array with eight elements.

TABLE II

Antenna Element Phasing by Mode

| Antenna Array Element Number Counter Cockwise Rotation | | | | | | | |
|---|---|---|---|---|---|---|---|
| 0 | 7 | 6 | 5 | 4 | 3 | 2 | 1 |
| Clock Wise rotation | | | | | | | |

| Mode | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 0 | 1/7(2π) | 2/7(2π) | 3/7(2π) | 4/7(2π) | 5/7(2π) | 6/7(2π) | 7/7(2π) |
| 2 | 0 | 2/7(2π) | 4/7(2π) | 6/7(2π) | 8/7(2π) | 10/7(2π) | 12/7(2π) | 14/7(2π) |
| 3 | 0 | 3/7(2π) | 6/7(2π) | 9/7(2π) | 12/7(2π) | 15/7(2π) | 18/7(2π) | 21/7(2π) |
| 4 | 0 | 4/7(2π) | 8/7(2π) | 12/7(2π) | 16/7(2π) | 20/7(2π) | 24/7(2π) | 28/7(2π) |
| 5 | 0 | 5/7(2π) | 10/7(2π) | 15/7(2π) | 20/7(2π) | 25/7(2π) | 30/7(2π) | 35/7(2π) |
| 6 | 0 | 6/7(2π) | 12/7(2π) | 18/7(2π) | 24/7(2π) | 30/7(2π) | 36/7(2π) | 42/7(2π) |
| 7 | 0 | 7/7(2π) | 14/7(2π) | 21/7(2π) | 28/7(2π) | 35/7(2π) | 42/7(2π) | 49/7(2π) |

The phase shifter circuits 308 are used to adjust the phase of each antenna element. There is one phase shifter circuit per element. The individual element phases are adjusted according to the table above.

FIG. 4C is a block diagram for two similar phase shifters, according to some embodiments of the present invention. As shown in FIG. 4C, each phase shifter includes a fixed Delay line and a programmable delay (Programmable Phase Shifter). The fixed delay line may be a commercial part used to obtain a coarse delay. The programmable delay device may also be a commercial part that provides a fine granular programmable delay. The combined delays are equivalent to the delays in the above table.

The programmable delay device is programmed by the PRN to phase Mapper 306 over interface 307. The data to be transmitted is provided to the phase shifter over interface 313 by the transmitter 312. The same data bit is provided to each of the phase shifters 308. Each phase shifter has a progressively advancing phase delay. Therefore, in this example, the same bit is transmitted eight times with a progressive delay applied to each radiating element. Transmitter 312 may be any type of digital transmitter. In this example, it is a transmitter supporting OOK modulation.

For example, in the case of 4 bits per mode and an antenna array with 8 elements, the 4-bit data, one bit at a time, are transmitted to all antenna elements, which are phased for a particular mode to transmit their data. After 4-bits are transmitted according to the phase offsets, the PRN generates another mode number, the phase of each of the antenna elements is re-computed accordingly, and another 4-bits are provided to all of the 8 antenna elements one at a time, and transmitted according to the re-computed phase offsets. This process is repeated all the data bits are transmitted. Although, 8 antenna elements and 4 bits per mode is used in this example, the phase offset may be changed at any number of bits and the number of antenna elements can be any number.

Figure 5A:
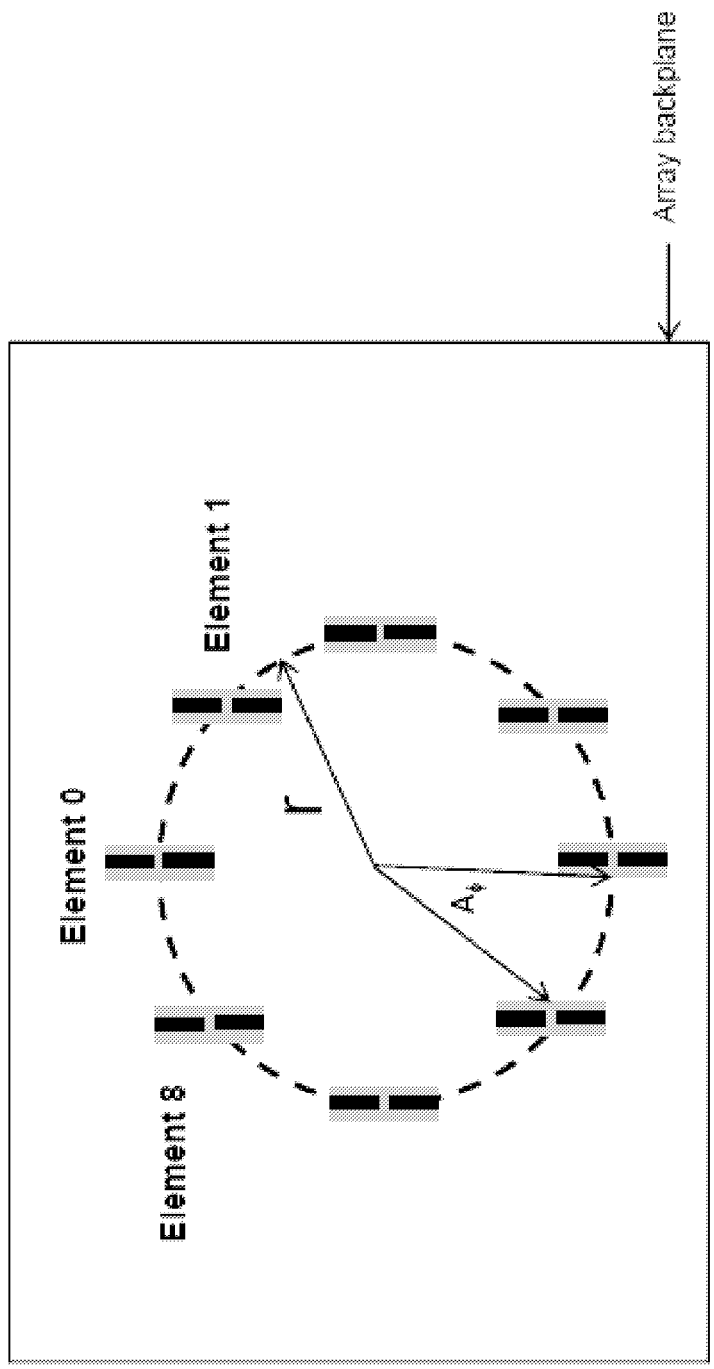

A more detail explanation of an antenna array is shown in FIGS. 5A and 5B. FIGS. 5A and 5B are exemplary diagrams depicting a circular antenna configuration, according to some embodiments of the present invention. In some embodiments, the antenna array is constructed on a metallic backplane to support the array elements. The backplane may be square, however, its size is not critical to the functioning of the present invention. The antenna array includes N elements, where N is an even number. An even number both ensures a full two-pi rotation around the array and ensures a uniform phase progression as one moves clockwise around the array. The angular spacing, $A_\phi$, of elements along the circumference is uniform, $A_\phi=360/N$.

Let n be the element number ranging from 0 to N−1. The 12 o'clock position on the array is element zero, which is the reference element. In some embodiments, each element has a wavelength Dipole antenna manufactured using strip line technology on a substrate. The dipoles are mounted a quarter wavelength above the backplane, as shown in the FIG. 5A. Each element is mounted such that it is oriented parallel to the left side of the figure. The radius of the array is r. This radius r is computed based on the desired start location of the far-field, $FF_d$ using the following relationship:

$$r = \frac{1}{2}\sqrt{\frac{\lambda FF_d}{2}}$$

FIG. 5B shows the backside of the antenna array. As shown, each element is mounted for example, with a Sub-Miniature version A (SMA) feed through connector to the backplane. A cable assembly is used to connect each element's SMA connector to the array interface connecter (E.g., 311 in FIG. 3), which are also SMA connectors.

Figure 8:
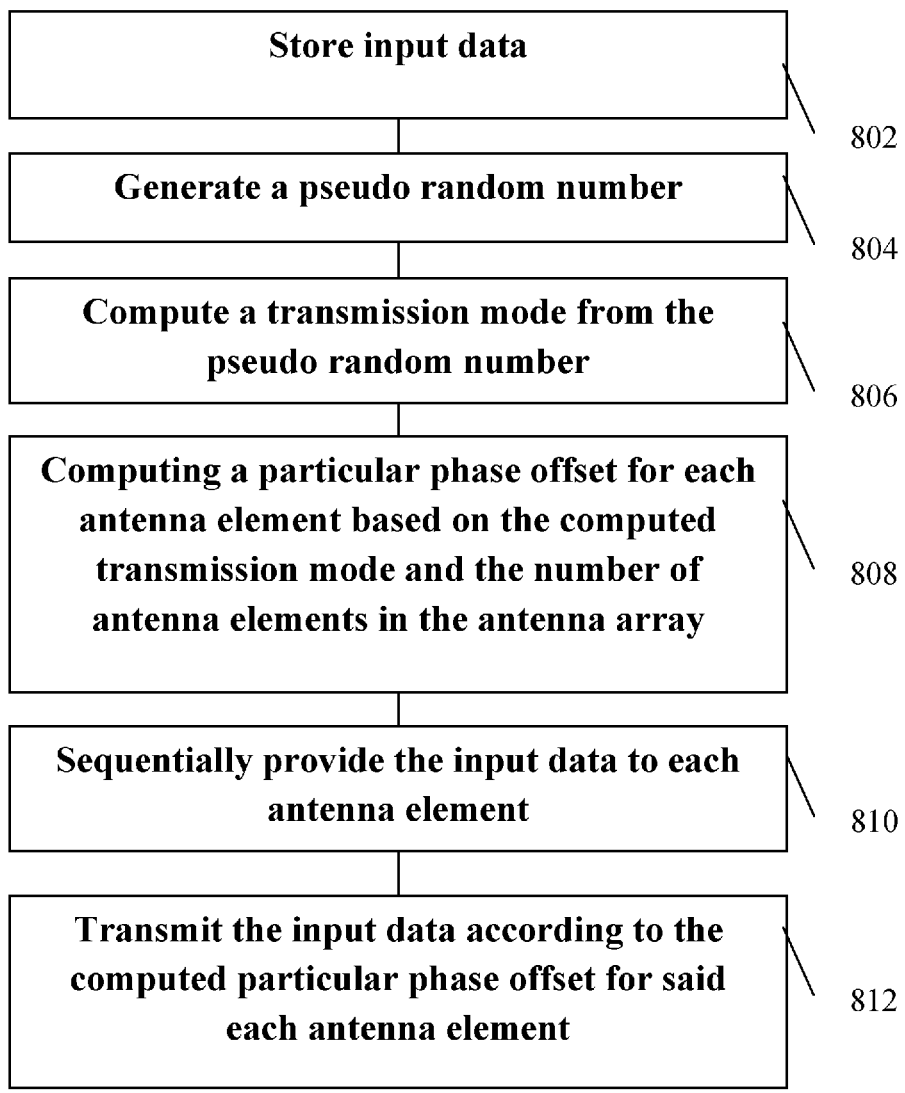
FIG. 8 is an exemplary process flow for data modulation in an antenna array, according to some embodiments of the present invention.

FIG. 8 is an exemplary process flow for data modulation in an antenna array, according to some embodiments of the present invention. As shown in block 802, input data (which includes a plurality of data bits) is stored in a buffer, for example a FIFO buffer. A pseudo random number is generated in block 804, and a transmission mode is determined from the pseudo random number, in block 806. Based on the computed transmission mode and the number of antenna elements in the antenna array, a particular phase offset for each of the antenna elements is computed, in block 808. An example of computing the particular phase offsets is shown and explained above with respect to Table II. In block 810, the stored input data is sequentially provided to each antenna element, one bit at a time. In block 812, the input data from each antenna element is transmitted from the respective antenna elements, according to the computed particular phase offset for said each antenna element. This way, in contrast to the FHSS communication methods, in which data is transmitted by rapidly changing carrier frequencies among many available frequencies, all of the input data bits are transmitted with the same frequency, according to the present invention.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope of the invention as defined by the appended claims.

The invention claimed is:

1. A method for data modulation in an antenna array including a plurality of antenna elements, the method comprising:
storing input data comprising of a plurality of data bits, in a buffer;
generating a pseudo random number;
computing a transmission mode from the pseudo random number;
based on the computed transmission mode and the number of antenna elements in the antenna array, computing a particular phase offset for each antenna element;
sequentially providing the stored input data, one bit at a time, to each antenna element; and
transmitting the input data from each antenna element according to the computed particular phase offset for said each antenna element, wherein all of the input data bits are transmitted with the same frequency.

2. The method of claim 1, further comprising
storing second input data comprising of a plurality of data bits, in the buffer;
generating a second pseudo random number;
computing a second transmission mode from the pseudo random number;
based on the computed second transmission mode and the number of antenna elements in the antenna array, computing a second particular phase offset for each antenna element;
sequentially providing the stored second input data, one bit at a time, to each antenna element; and
transmitting the second input data from each antenna element according to the computed second particular phase offset for said each antenna element, wherein all of the second input data bits are transmitted with the same frequency.

3. The method of claim 1, further comprising transmitting the computed transmission mode, and the particular phase offsets for the antenna elements to a receiver to demodulate the transmitted data.

4. The method of claim 1, wherein the input data is transmitted from each antenna element, using on-off keying (OOK) method.

5. The method of claim 1, wherein the pseudo random number is generated using a four-stage maximal length sequence generator with $2^4-1$ states.

6. The method of claim 1, wherein a same input bit is transmitted N times with a progressive delay applied to each N antenna element, where N is an integer.

7. An apparatus for data modulation in an antenna array including a plurality of antenna elements comprising:
a buffer for storing input data comprising of a plurality of data bits;

a pseudo random number generator for generating a pseudo random number;

a mapper circuit for computing a transmission mode from the pseudo random number;

a plurality of phase shifters for determining a particular phase offset for each antenna element, based on the computed transmission mode and the number of antenna elements in the antenna array; and a transmitter for sequentially providing the stored input data, one bit at a time, to each antenna element, wherein the antenna array transmits the input data from each antenna element according to the computed particular phase offset for said each antenna element, and wherein all of the input data bits are transmitted with the same frequency.

8. The apparatus of claim 7, wherein the antenna array transmits the computed transmission mode, and the particular phase offsets for the antenna elements to a receiver to demodulate the transmitted data.

9. The apparatus of claim 7, wherein the input data is transmitted from each antenna element, using on-off keying (OOK) method.

10. The apparatus of claim 7, wherein the pseudo random number is generated using a four-stage maximal length sequence generator with $2^4-1$ states.

11. The apparatus of claim 7, wherein a same input bit is transmitted N times with a progressive delay applied to each N antenna element, where N is an integer.

12. The apparatus of claim 7, further comprising a counter for counting the number of bits transmitted per transmission mode.

* * * * *